(12) United States Patent
McCure

(10) Patent No.: US 9,103,306 B2
(45) Date of Patent: Aug. 11, 2015

(54) ENGINE NOISE ATTENUATION

(71) Applicant: Ford Global Technologies, LLC, Dearborn, MI (US)

(72) Inventor: Randall Paul McCure, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/022,076

(22) Filed: Sep. 9, 2013

(65) Prior Publication Data

US 2015/0068481 A1     Mar. 12, 2015

(51) Int. Cl.
| | |
|---|---|
| F02M 35/10 | (2006.01) |
| F02M 35/12 | (2006.01) |
| F02M 35/14 | (2006.01) |
| F02K 1/82 | (2006.01) |
| F01N 1/08 | (2006.01) |
| F01N 13/00 | (2010.01) |
| F01N 1/02 | (2006.01) |

(52) U.S. Cl.
CPC ................ F02M 35/12 (2013.01); F02K 1/827 (2013.01); F02M 35/1211 (2013.01); F02M 35/14 (2013.01); F01N 1/02 (2013.01); F01N 1/089 (2013.01); F01N 13/007 (2013.01); F02M 35/10295 (2013.01); F02M 35/1233 (2013.01); F02M 35/1255 (2013.01); F02M 35/1272 (2013.01); F05D 2220/40 (2013.01)

(58) Field of Classification Search
CPC ......... F01N 1/089; F01N 1/02; F01N 13/007; F02M 35/1255; F02M 35/10295; F02M 35/1233
USPC ......... 123/184.21, 184.53; 181/264, 255, 229
See application file for complete search history.

(56) References Cited

U.S. PATENT DOCUMENTS

| | | | | |
|---|---|---|---|---|
| 1,061,272 A | * | 5/1913 | Witt | 181/255 |
| 1,081,348 A | * | 12/1913 | Unke | 181/264 |
| 1,772,589 A | * | 8/1930 | Beamer | 181/265 |
| 2,485,555 A | * | 10/1949 | Bester | 181/260 |
| 2,903,085 A | * | 9/1959 | Miller | 181/255 |
| 4,574,914 A | * | 3/1986 | Flugger | 181/268 |
| 4,809,812 A | * | 3/1989 | Flugger | 181/268 |
| 5,014,816 A | | 5/1991 | Dear et al. | |
| 5,444,197 A | * | 8/1995 | Flugger | 181/264 |
| 5,659,158 A | * | 8/1997 | Browning et al. | 181/268 |
| 6,024,189 A | * | 2/2000 | Heuser | 181/264 |
| 6,084,971 A | | 7/2000 | McLean | |
| 6,089,347 A | * | 7/2000 | Flugger | 181/264 |
| 7,905,319 B2 | * | 3/2011 | Sullivan | 181/250 |
| 8,257,812 B2 | | 9/2012 | Youn et al. | |
| 8,408,357 B2 | | 4/2013 | Cheung | |
| 2009/0308686 A1 | * | 12/2009 | Sullivan | 181/255 |

(Continued)

FOREIGN PATENT DOCUMENTS

EP     2551509A1  A1    1/2013

*Primary Examiner* — Marguerite McMahon
*Assistant Examiner* — James Kim
(74) *Attorney, Agent, or Firm* — Julia Voutyras; Allenman Hall McCoy Russell & Tuttle LLP

(57) ABSTRACT

An induction passage noise attenuator and a system are provided. The induction passage noise attenuator may include a series of surfaces arranged within an enclosure upstream from a clean side air duct on an induction inlet for an internal combustion engine. Each surface of the series of surfaces may have a diametric extent being substantially in line with an inner diameter of the clean side air duct.

15 Claims, 3 Drawing Sheets

(56) References Cited

U.S. PATENT DOCUMENTS

2010/0236011 A1* 9/2010 Kang et al. ............. 15/326
2011/0139110 A1* 6/2011 Miller et al. ............. 123/184.53
2012/0012419 A1* 1/2012 Von Linsowe ............. 181/228
2012/0222641 A1* 9/2012 Mackenzie et al. ...... 123/184.21

* cited by examiner

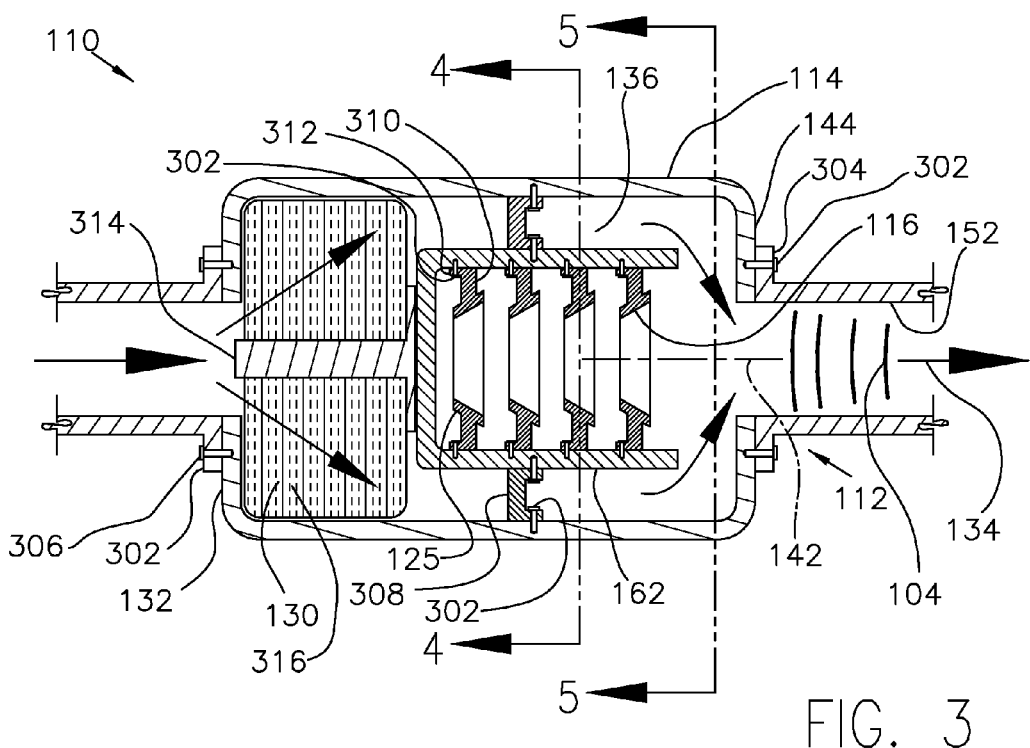
FIG. 3
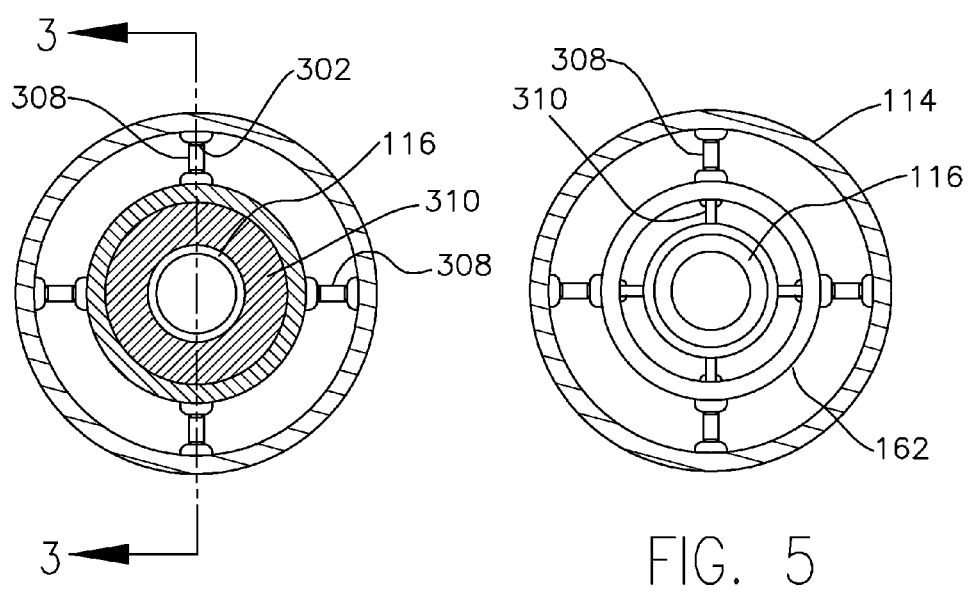
FIG. 4
FIG. 5

ENGINE NOISE ATTENUATION

TECHNICAL FIELD

The present application relates to a device and a system for reducing a level of internal combustion engine noise audible through the engine's induction air system.

BACKGROUND AND SUMMARY

In the absence of special noise reduction treatment, loud, objectionable, harsh, and unwanted noise from engine combustion may travel thru the air induction system and may egress from the avenue(s) of air ingress.

Efforts have been made to reduce the levels of audible noises from various engine systems. For example, the noises produced from the flow of induction air flowing through an induction passage and through a turbo compressor on its way to the engine combustion chamber(s) are often addressed by fitting an inlet silencer to the compressor wheel inlet to attenuate the sound waves produced as air accelerates into the compressor. U.S. Pat. No. 6,736,238 provides an air intake silencer configured to reduce turbulence in the air flow from the silencer to the intake of the compressor. The patent discloses a housing containing a plurality of axially spaced annular noise attenuating baffles. The baffles define a series of axially spaced generally annular partial flow passages such that air flowing through the silencer is initially split and then merges into the axial outlet passage. The dimensions of the annular partial flow passages are made to vary so that the velocity of air flow through the passages is greater for passages closer to the axial outlet aperture.

The inventors of the present application have recognized a number of problems with the above approach. For example, the disclosed approach merely seeks to reduce noises generated from within the intake passage, specifically noises due to turbulence in the intake flow, and not noises that come from the engine. However, embodiments in accordance with the present disclosure provide an induction passage noise attenuator and a system that attenuates audible noise emitted from the engine.

Various embodiments in accordance with the present disclosure may provide a series of surfaces that may be directed inward and may therefore present a relatively smooth path for sound waves to travel inward. For sound waves that may be directed outwardly, a series of pockets between and/or among the series of surfaces may be provided. In this way, at least one path along which noise may travel from the engine may be made "rough" and may be otherwise more disruptive to sound waves that may be emitted from the engine.

Various embodiments in accordance with the present disclosure may provide a noise attenuator, or noise filter, that may be placed directly in line with the clean side air duct. In this way, the noise attenuator and/or noise filter may be positioned at an area of concentrated noise. In this way, embodiments provided in accordance with the present disclosure may operate at relatively easy to achieve levels of efficiency, for example 50% or less efficiency.

Embodiments may provide an induction passage noise attenuator that may include a series of surfaces arranged within an enclosure upstream from a clean side air duct on an induction inlet for an internal combustion engine. Each surface of the series of surfaces may have a diametric extent being substantially in line with an inner diameter of the clean side air duct.

Other embodiments may provide an induction passage noise attenuator that may include an enclosure having a central axis. The enclosure may have an enclosure inside surface that may be a second radial distance from the central axis. The enclosure may be configured to be disposed upstream from a clean side air duct. The clean side air duct may be fluidically coupled with an intake passage for an internal combustion engine. The clean side air duct may have a clean side air duct inner surface that may be a first radial distance from the central axis. A series of surfaces may be arranged in the enclosure. Outer edges of each of the series of surfaces may be disposed at a third radial distance from the central axis. The third radial distance may be substantially equal to (e.g., within 5%), or greater than, the first radial distance and less than the second radial distance.

Other embodiments may provide a system. The system may include an intake air passage for passing intake air to an engine including an upstream passage and a downstream passage. The downstream passage may have a first inner diameter. An enclosure may be fluidically coupled at an upstream side thereof to receive the intake air from the upstream passage, and fluidically coupled at a downstream side thereof to pass the intake air to the downstream passage. The enclosure may have a second inner diameter bigger than the first inner diameter. A series of surfaces may be located within the enclosure. Each surface of the series of surfaces may have an outer diameter greater than or substantially in line with the first inner diameter. For example, the surface may have a center that is in line with the first inner diameter.

Embodiments may provide a series of surfaces that may be directed inward and may present a relatively smooth path for sound waves to travel inward toward the engine, specifically toward the intake manifold. The series of surfaces may also provide a series of pockets between adjacent surfaces. In this way a "rough" path which may be disruptive to the sound waves may make it more difficult for sound waves to travel from the engine and out through the induction passage.

In some embodiments the precise size of the enclosure, or chamber, the positioning of the chamber, and/or design of various other features may be optimized for different engines and vehicle lines. Among other thing in this way, smooth, even, and gradual air flow, may be provided which may produce low resistance, which may be important for air induction system performance, and/or engine performance.

Various embodiments may include a sonically porous filler material, such as fiberglass strands, or the like. The material may allow a certain amount of sonic penetration. The material may also act to gradually absorb, attenuate, and diffract sound waves. The material may also serve to discourage efficient reflection of sound waves off internal walls. With various embodiments the filler material, and/or the filler material characteristics, may be advantageously selected for one or more particular applications. An example advantageous selection may include varying the density along the chamber.

Various embodiments described herein may place a single chamber directly in line with the noise path. In this way, a broad band of noise may be attenuated. Systems and devices in accordance with various embodiments may be placed in a convenient location within the engine compartment. Embodiments may help reduce or avoid using complex, expensive, iterative, mathematical analysis of the engine/induction system. In this way, costs may be reduced among other advantages.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is a cross sectional view of an example noise attenuation device in accordance with the present disclosure, which may be used in the systems of FIGS. 1 and/or 2.

FIG. 4 is a cross sectional view of the device shown in FIG. 3 taken at the line 3-3.

FIG. 5 is a cross sectional view of the device shown in FIG. 3 taken at the line 5-5.

DETAILED DESCRIPTION

Figure 1:
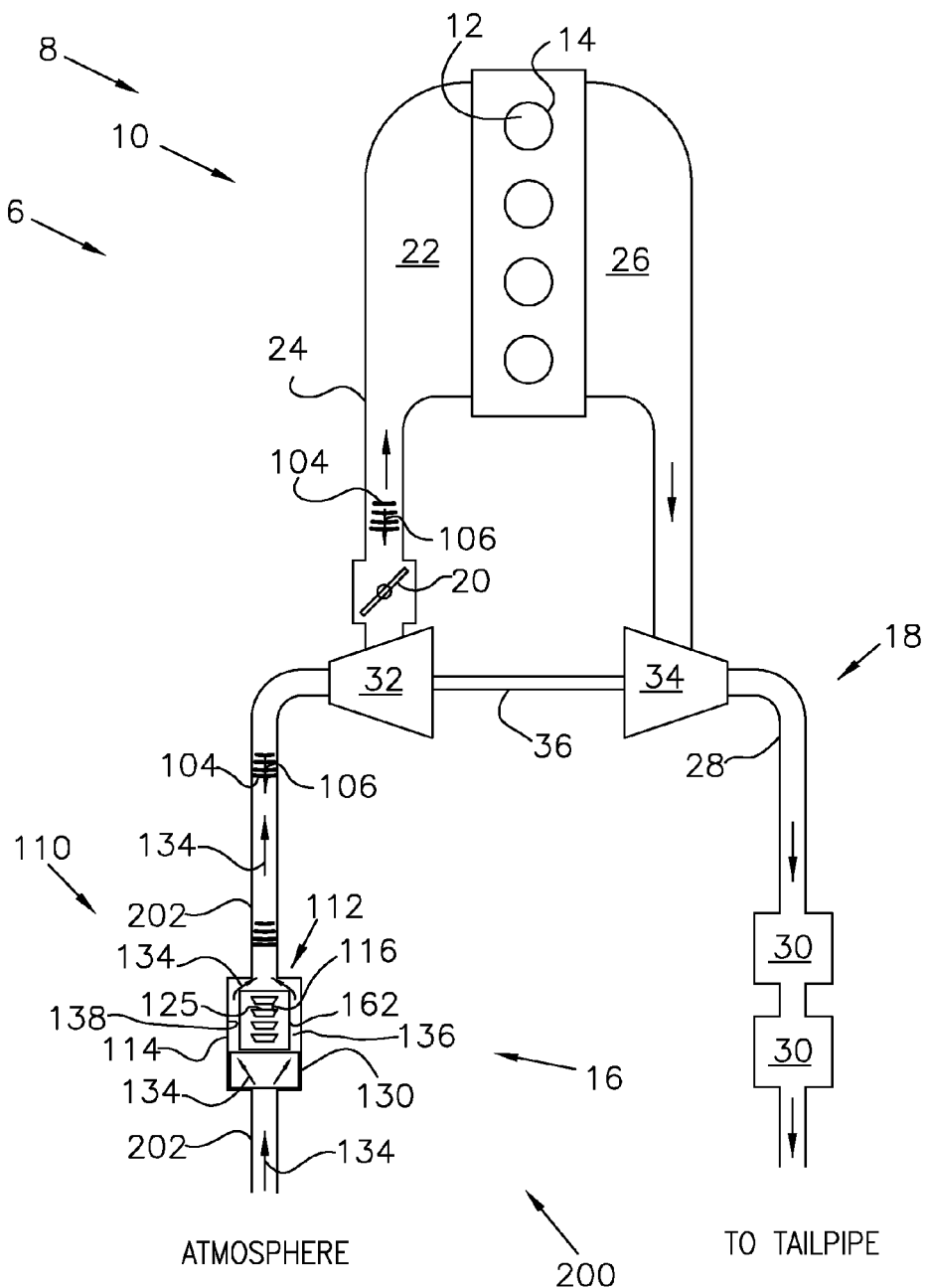
FIG. 1 illustrates a schematic depiction of an engine system including an example system in accordance with the present disclosure.
Figure 2:
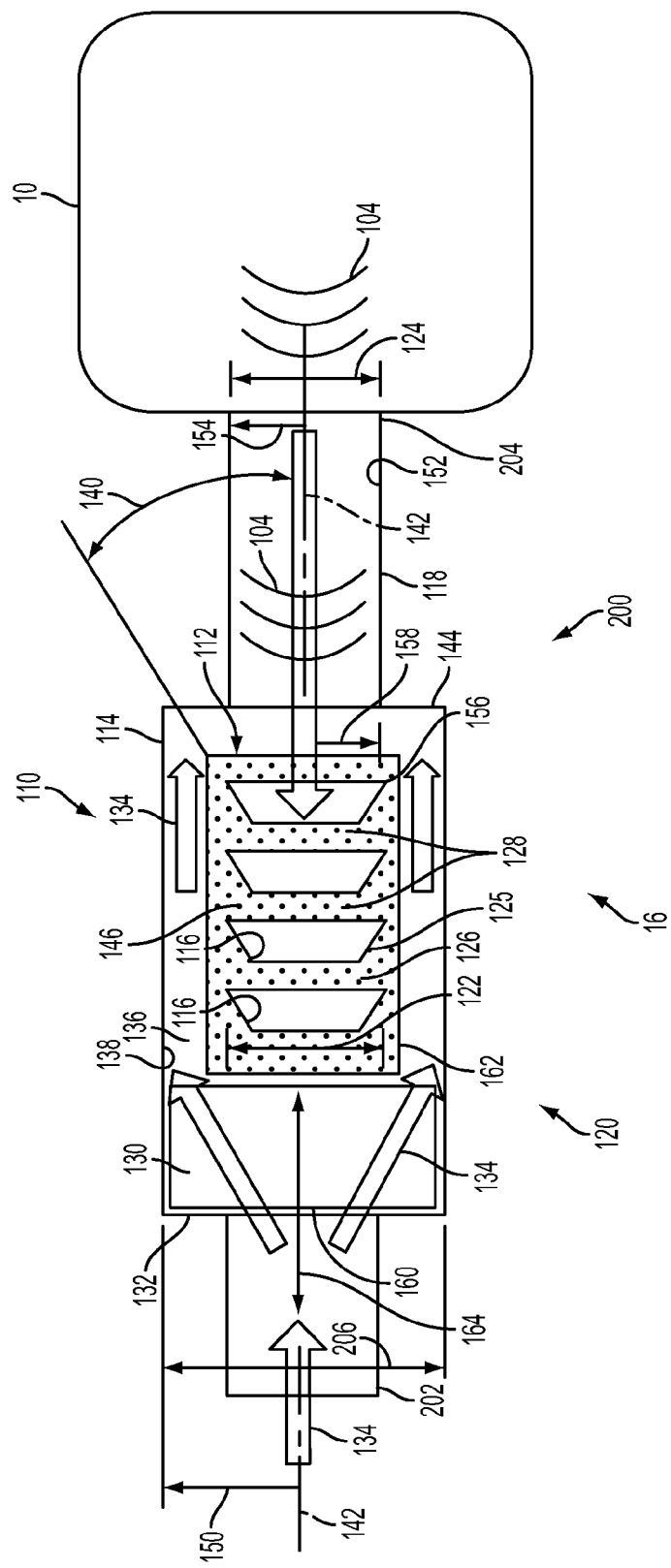
FIG. 2 is a sectional side view of an example induction passage noise attenuator that may be used with the engine system illustrate in FIG. 1.

FIG. 1 illustrates a schematic depiction of an engine system including an example induction passage noise attenuator, and system in accordance with the present disclosure. FIG. 2 is a sectional side view of an example induction passage noise attenuator that may be used with the engine system illustrate in FIG. 1. The vehicle system 6 may include an engine system 8. The engine system 8 may include an engine 10 having a plurality of cylinders 12 defining a respective plurality of combustion chambers 14. The engine 10 may include an engine intake, or intake passage 16, and an engine exhaust 18. The engine intake 16 may include a throttle 20 fluidly coupled to an engine intake manifold 22 via an intake passage 24 to regular intake air flow. The engine exhaust 18 may include an exhaust manifold 26 leading to an exhaust passage 28 that routes exhaust gas to the atmosphere via a tailpipe. The engine exhaust passage 28 may include one or more emission control devices 30, which may be mounted in a close-coupled position in the exhaust 18. The one or more emission control devices 30 may include a three-way catalyst, lean NOx trap, diesel particulate filter, oxidation catalyst, etc. It will be appreciated that other components may be included in the engine such as a variety of valves and sensors.

The engine intake 16 may further include a boosting device, such as a compressor 32. Compressor 32 may be configured to draw in intake air at atmospheric air pressure and boost it to a higher pressure. The boosting device may be a compressor 32 of a turbocharger, wherein the boosted air may be introduced pre-throttle. The compressor 32 may be part of a supercharger. The throttle 20 may instead be positioned before the compressor 32. Using the boosted intake air, a boosted engine operation may be performed. The compressor 32 may be driven by a turbine 34 coupled with the compressor 32 with a shaft 36.

Noise that may emit from and/or be generated by the engine 10, and or other components associated with the engine 10, such as the compressor 32 is depicted in FIGS. 1-2 as sound waves 104 illustrated with parallel or concentric curves. The sound waves 104 may move in an upstream direction 106 through the engine intake 16 in a direction opposite to the direction of the induction air path 134.

Various embodiments may provide an induction passage noise attenuator 110. The induction passage noise attenuator 110 may include a series of surfaces 112 arranged within an enclosure 114. The series of surfaces 112 may be located upstream from a clean side air duct 118 on an induction air passage 120, or engine intake 16, for the internal combustion engine 10. Each surface 116 of the series of surfaces 112 may have a diametric extent 122 (FIG. 2) that may be substantially in line with an inner diameter 124 of the clean side air duct 118.

The series of surfaces 112 may be comprised of a number of discrete surfaces 116 and/or a number of surfaces 116 in various combinations and/or various inter-coupled configurations. In some embodiments each of the surfaces 116 in the series of surfaces 112 may be included on and/or may be formed by a frusto-conical member 125.

The series of surfaces 112 may be arranged to form a series of pockets 126 in line with an induction air flow path defined within the clean side air duct 118. Each pocket 128 in the series of pockets 126 may be defined accordingly between adjacent surfaces 116 and may be defined between adjacent frusto-conical members 125.

Various embodiments may also include an air filter 130 disposed within the enclosure 114 substantially adjacent to an upstream side 132 of the enclosure 114, an induction air path 134 may be configured to pass through the air filter 130 to an annular passage 136 between an inside surface 138 of the enclosure 114 and the diametric extent 122 of the series of surfaces 112. For example, there may be only open space and no other components between the air filter 130 and the upstream side 132 of the enclosure. In some cases the engine intake 16 may have none circular cross sections, in which case the induction air path 134 may pass between the enclosure 114 and the series of surfaces 112 along a path of a shape other than annular.

With various embodiments all or some of the surfaces 116 in the series of surfaces 112 may each be arranged at an angle 140 with a central axis 142 of the enclosure 114. The angle may be an acute angle. In some cases all or some of the surfaces 116 in the series of surfaces 112 may each be arranged at angle 140 with the central axis 142 of the enclosure of approximately between 25 degrees and 65 degrees. The angle 140 may be measured from a downstream side 144 of the enclosure 114.

In some cases each of the frusto-conical members 125 may be substantially the same size and shape. In some cases two or more of the frusto-conical members 125 may have differing characteristics such as different sizes and/or shapes. Similarly, in some cases each of the surfaces 116 may be substantially the same size and shape and/or positioned at substantially the same or similar angles. On the other hand in some cases two or more of the surfaces 116 and/or the frusto-conical members 125 may have differing characteristics such as different sizes, and/or shapes, and/or angles of their positioning.

In some embodiments, there may be only space and no components (other than optional mounting brackets which may be omitted in some examples) between adjacent frusto-conical members 125 within surrounding surface 162. In another example, there may be no components other than a porous filter material, between and around the frusto-conical members 125 within surrounding surface 162. Further, surrounding surface 162 may fully enclose all of the frusto-conical members 125 (and porous material), other than a rear, downstream, entrance and/or a front upstream entrance. The surrounding surface may be positioned within and fully enclosed by the air induction box, other than front and rear entrances. Outside, e.g., annularly surrounding, the surrounding surface 162, is an open, free, air path unobstructed by components, other than an optional mount for mounting the surrounding surface 162. Further, a charge air cooler may be positioned downstream of compressor 32.

As noted above, various embodiments may also include a sonically porous filler material 146 (represented in FIG. 2 with small circles) that may substantially encase the series of surfaces 112. Some embodiments may also include a sonically porous filler material 146 that may only partially encase the series of surfaces 112. Some embodiments may include a sonically porous filler material 146 located between adjacent surfaces 116 in the series of surfaces 112. Some embodiments may also include a sonically porous filler material 146 located between adjacent frusto-conical members 125. The sonically porous filler material 146 may include, for example, fiberglass strands. The sonically porous filler material 146 may allow a certain amount of sonic penetration. The sonically porous filter material may serve to retain the frusto-conical members 125 within the surrounding surface and spaced away from the surrounding surface. In other example, mounting brackets may be used.

As illustrated, the air filter and frusto-conical members may be linearly positioned in line with one another. However, other embodiments may include various bends upstream and/or downstream of the air filter/surrounding surface.

In this way, the series of surfaces 112 and/or the sonically porous filler material 146 may tend to gradually absorb, attenuate, and diffract sound waves. Also in this way, the series of surfaces 112 may tend to disrupt an otherwise more efficient reflection of sound waves off internal walls. The exact material may be optimized for any particular application. For example the density of the sonically porous filler material 146 along the chamber may be varied. Noise emitted from the engine may be better attenuated verses conventional approaches. A single chamber directly in line with the noise path in accordance with various embodiments may be substantially effective at broad band noise attenuation. In this way various embodiments may be placed in a convenient location within the engine compartment and/or within a vehicle body. In this way, complex and/or expensive iterative, mathematical analysis of the engine/induction system may be avoided.

Various embodiments may provide an induction passage noise attenuator 110 that may include an enclosure 114 that may have a central axis 142. The enclosure 114 may also have an enclosure inside surface 138. The enclosure inside surface 138 may be a second radial distance 150 from the central axis 142. The enclosure 114 may also be configured to be disposed upstream from a clean side air duct 118 the clean side air duct 118 may have a clean side air duct inner surface 152 that being a first radial distance 154 from the central axis 142.

A series of surfaces 112 may be arranged in the enclosure 114. outer edges 156 of each surface 116 of the series of surfaces 112 may be disposed at a third radial distance 158 from the central axis 142, the third radial distance 158 may be substantially equal to, or greater than, the first radial distance 154 and may be less than the second radial distance 150. With some embodiments the third radial distance 158 may be substantially equal to the first radial distance 154.

The induction passage noise attenuator 110 may also include an air filter 130 disposed within the enclosure 114. There may be an enclosure inlet 160 for receiving intake air. An annular passage 136 may be located within the enclosure 114 downstream from the air filter 130 and between the enclosure 114 inside surface 138 and radially outside the series of surfaces 112.

The induction passage noise attenuator 110 may also include a surrounding surface 162 which may surround the series of surfaces 116 and may be spaced from the enclosure inside surface 138. The annular passage 136 may be defined therebetween. A sonically porous filler material 146 may be located within the surrounding surface 162, and in some cases may be substantially contained by the surrounding surface 162. In some examples, the sonically porous material 146 may substantially fill the surrounding surface 162 and spaces between the series of surfaces 112 in a substantially homogeneous way. In other examples the sonically porous filler material 146 may be arranged to vary in density along the enclosure 114 as measured in an axial direction 164 and/or in a radial direction.

Various embodiments may provide a system 200. The system 200 may include an intake air passage, or induction air passage 120, for passing intake air to an engine 10. The induction air passage 120 may include an upstream passage 202 and a downstream passage 204. The downstream passage 204 may have a first inner diameter 124. An enclosure 114 may be fluidically coupled at an upstream side 132 thereof to receive the intake air from the upstream passage 202 and fluidically coupled at a downstream side 144 thereof to pass the intake air to the downstream passage 204. The enclosure 114 may have a second inner diameter 206 bigger than the first inner diameter 124. A series of surfaces 112 may be located within the enclosure 114. Each surface 116 of the series of surfaces 112 may have an outer diameter greater than, or substantially in line with, the first inner diameter 124.

The system may also include an air filter 130 disposed within the enclosure 114 upstream from the series of surfaces 112. An intake air path 134 may be configured to pass through the air filter 130 then between the enclosure 114 and radially outside the outer diametric extent 122 of the series of surfaces 112 and to the downstream passage 204.

The system may also include a surrounding surface 162 disposed around at least the series of surfaces 112. A sonically porous material 146 may be disposed within the surrounding surface 162 and between adjacent surfaces of the series of surfaces 112.

FIG. 3 is a cross sectional view of an example noise attenuation device illustrating additional example details that may be included with some embodiments. The view is taken at the line 4-4 in FIG. 4. FIG. 4 is in turn a cross sectional view of the device shown in FIG. 3 taken at the line 3-3 therein. FIG. 5 is a cross sectional view of the example noise attenuation device of FIG. 3 taken at the line 5-5 in FIG. 3. FIGS. 1-3 illustrate example arrangements and mechanisms various embodiments may include to attach some of the elements described herein to other elements. For example, the enclosure 114 may be attached at a downstream side 144 thereof to the clean side air duct 118 with screws 302 arranged to pass through holes in a flange 304. The enclosure 114 may be attached at an upstream side 132 thereof to the clean side air duct 118 with screws 302 arranged to pass through holes in a flange 306. Other attachment mechanism may be used such as bolts instead of screws 302, and/or hoses with hose clamps and the like.

Inside the enclosure 114 the surrounding surface 162 may be coupled with the inside of the enclosure with brackets 308. The brackets 308 may be attached with screws 302 as illustrated, or bolts, and the like.

Each surface 116 of the series of surfaces 112 may also be coupled with an inside of the surrounding surface 162 with brackets and the like. The illustrated example shows four integral brackets 310 each with a corresponding flange 312 attached to the surrounding surface 162 with screws 302. Four integral brackets 310 are shown formed integrally with the surfaces 112 disposed on frusto-conical members 125. The four integral brackets 310 may be substantially evenly space circumferentially and may provide an annular passage 136 for the flow path. Discrete brackets may be used addition to, or instead of the example integral brackets 310 illustrated. Other coupling, and/or attachment, arrangements and/or numbers of coupling elements may be used.

The filter 130 may include structural element 314 that may provide some structure and/or support to a filtering material 316. The structural element 314 may be held against, or positioned adjacent to, or attached to the surrounding surface 162 by any suitable mechanism.

With various embodiments one or more of characteristics of the series of surfaces 112 may be modified according to preselected audible frequencies that may be determined to be emitted from, or possibly emitted from, the engine 10. The one or more characteristics may selected from a set comprising or consisting of: a size of each surface; a spacing between adjacent surfaces; and an angle of each surface as measured from a central axis of the intake air passage. Other characteristics may be selected and used.

It should be understood that the systems and methods described herein are exemplary in nature, and that these specific embodiments or examples are not to be considered in a limiting sense, because numerous variations are contemplated. For example, the above technology can be applied to V-6, I-4, I-6, V-12, opposed 4, and other engine types. Accordingly, the present disclosure includes all novel and non-obvious combinations of the various systems and methods disclosed herein, as well as any and all equivalents thereof.

The invention claimed is:

1. An induction passage noise attenuator comprising:
an outer first enclosure;
an air filter disposed within the outer first enclosure and physically coupled on a downstream surface to an upstream surface of a surrounding surface open only on a downstream end, the surrounding surface housing a sonically porous filler material disposed between a series of surfaces, each of the surfaces having a center hole therein, arranged within an enclosure upstream from a clean side air duct on an induction inlet of an engine, each surface of the series of surfaces being angled outward in a downstream direction and having a diametric extent being substantially in line with an inner diameter of the clean side air duct.

2. The induction passage noise attenuator of claim 1, wherein each of the surfaces in the series of surfaces is a frusto-conical member.

3. The induction passage noise attenuator of claim 2, wherein each of the frusto-conical members are substantially the same size and shape.

4. The induction passage noise attenuator of claim 1, wherein the series of surfaces are arranged to form a series of pockets in line with an induction air flow path defined within the clean side air duct.

5. The induction passage noise attenuator of claim 1, wherein the air filter is disposed within the outer first enclosure substantially adjacent to an upstream side of the first outer enclosure, and extends radially across a diametric extent of the outer first enclosure such that air through the induction passage is configured to pass through the air filter before entering an annular passage between an inside surface of the outer first enclosure and the diametric extent of the series of surfaces.

6. The induction passage noise attenuator of claim 1, wherein the series of surfaces are each arranged at an acute angle with respect to a central axis of the outer first enclosure.

7. The induction passage noise attenuator of claim 1, wherein the series of surfaces are each arranged at an angle with respect to a central axis of the outer first enclosure of approximately between 25 degrees and 65 degrees.

8. The induction passage noise attenuator of claim 1, wherein the sonically porous filler material includes fiberglass strands.

9. An induction passage noise attenuator comprising:
an outer first enclosure having a central axis, the outer first enclosure having an enclosure inside surface being a second radial distance from the central axis configured to be disposed upstream from a clean side air duct, the clean side air duct having a clean side air duct inner surface being a first radial distance from the central axis;
an inner second enclosure open only on a downstream end where an outer surface of the inner second enclosure is separated from the inside surface of the outer first enclosure, the inner second enclosure housing a sonically porous material positioned between a series of frusto-conical surfaces, the series of frusto-conical surfaces of the same size and shape arranged in the inner second enclosure and having centers aligned with the central axis and angled outward in a downstream direction of engine intake airflow, outer edges of each of the series of surfaces being disposed at a third radial distance from the central axis, the third radial distance being substantially equal to, or greater than, the first radial distance and less than the second radial distance; and
an air filter disposed with the outer first enclosure, and physically coupled adjacent to an upstream end of the inner second enclosure.

10. The induction passage noise attenuator of claim 9, wherein the third radial distance is substantially equal to the first radial distance.

11. The induction passage noise attenuator of claim 10, further comprising an enclosure inlet for receiving intake air, an annular passage located with the outer first enclosure downstream from the air filter and between the enclosure inside surface and radially outside the series of surfaces.

12. The induction passage noise attenuator of claim 9, wherein the sonically porous material substantially fills a space in a substantially homogeneous way.

13. The induction passage noise attenuator of claim 9, wherein the sonically porous material is arranged to vary in density along the inner second enclosure as measured in an axial direction.

14. A system comprising:
an intake air passage for passing intake air to an engine including an upstream passage and a downstream passage, the downstream passage having a first inner diameter;
a first enclosure fluidically coupled at an upstream side thereof to receive the intake air from the upstream passage and fluidically coupled at a downstream side thereof to pass the intake air to the downstream passage, the first enclosure having a second inner diameter bigger than the first inner diameter, and having a smaller cylindrical second enclosure open only at a downstream end and positioned within the first enclosure, the second enclosure positioned with the first enclosure such that intake air passes around the second enclosure within the first enclosure through a space between an exterior of the second enclosure and an interior of the first enclosure;
a series of surfaces within the second enclosure, each surface of the series of surfaces having centers aligned with a central axis and the surfaces each being angled outward in a downstream direction of engine intake airflow and having an outer diameter greater than and substantially in line with the first inner diameter, and a sonically porous material positioned between each of the series of surfaces; and an air filter physically coupled adjacent to an upstream surface of the second enclosure.

15. A system, comprising:

a cylindrical duct upstream of a compressor leading to an engine, the cylindrical duct including an air filter with a cylindrical interior opening coupled around a structural element upstream of a noise attenuating section, the noise attenuating section having, with the cylindrical duct, a cylindrical enclosure open only on a downstream side, the structural element coupled to an upstream surface of the cylindrical enclosure, the cylindrical enclosure housing a plurality of plates with holes therein angled outward in a downstream direction and spaced apart from one another in series with sonically porous material positioned within the cylindrical enclosure and between adjacent surfaces of the plurality of plates, the plates coupled to an interior surface of the cylindrical enclosure, with airflow passing around an exterior of the cylindrical enclosure en route to the engine.

\* \* \* \* \*